United States Patent [19]

McCandless, II

[11] Patent Number: 4,483,639
[45] Date of Patent: Nov. 20, 1984

[54] CONNECTION SYSTEM

[75] Inventor: Bruce McCandless, II, Seabrook

[73] Assignee: The United States of America as represented by the Administrator of the National Aeronautics and Space Administration, Washington, D.C.

[21] Appl. No.: 393,582

[22] Filed: Jun. 30, 1982

[51] Int. Cl.³ ............................................. B25G 3/00
[52] U.S. Cl. .................................. 403/317; 292/252; 81/177 G
[58] Field of Search .............. 403/315, 316, 317, 324, 403/328; 292/252; 81/177 G

[56] References Cited

U.S. PATENT DOCUMENTS 4,120,232  10/1978  Hoffman, Jr. .................... 403/316 X
4,218,940   8/1980  Main ............................. 81/177 G X

FOREIGN PATENT DOCUMENTS 2538128  3/1977  Fed. Rep. of Germany ...... 403/328
 717056 10/1954  United Kingdom ................ 292/252

Primary Examiner—Andrew V. Kundrat
Attorney, Agent, or Firm—Edward K. Fein; John R. Manning; Marvin F. Matthews

[57] ABSTRACT

A mechanical connection system comprises a first body 10 defining a receptacle 38 and a second body 12 defining a pin 24 matingly receivable in said receptacle 38 by relative movement in a first directional mode. A primary latch 64 is engagable between the first 10 and second 12 bodies to retain the pin 24 in the receptacle 38, the primary latch 64 being reciprocable in a second directional mode transverse to the first directional mode. A lock member 50 carried by one of the bodies 10 or 12 is operatively associated with the primary latch 64 and movable, transverse to the second directional mode, between a locking position maintaining engagement of the primary latch 64 and a releasing position permitting release of the primary latch 64. The lock member 50 includes an operator portion 54 engagable to move the lock member 50 from its locking position to its releasing position. The operator 54 is located internally of the first body 10. An actuator 14 is selectively insertable into and disengagable from the first body 10, the actuator 14 being movable relative to the first body 10 when so inserted therein for engagement with and operation of the operator 54.

22 Claims, 2 Drawing Figures

CONNECTION SYSTEM

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

The present invention pertains to systems for connecting and disconnecting component parts of a tool or the like, and is particularly applicable to tools and other composite assemblies which must be used in environments in which it is important to maintain positive control over each individual component of the assembly. For example, the invention may be applied to a socket wrench set in which a ratchet wrench handle must be alternately connected to various size sockets and/or extensions. The need for positive control over these various component parts may arise for a number of different reasons in various contexts and environments.

For example, a typical application of the invention may be to tool sets adapted for use in extravehicular activities in the space program. It can readily be appreciated that, if one of the component parts of a tool were dropped during such activity, it would be difficult or impossible to recover, not only due to the low or zero gravity environment, but also due to the bulky protective clothing which must be worn by the user in such environment. Similar problems can occur, for example, in subsurface diving operations as well as other situations in which workers must wear cumbersome gloves and/or other garments to protect against pressure or temperature extremes, hazardous chemicals, physical injury, etc. In still other situations, loss of a component part of a tool may cause damage and/or hazard by falling into moving machinery, onto personnel or other equipment, etc. For example, in one known instance, a wrench socket was inadvertently dropped into a missile silo. After falling approximately 70 feet, the socket ricocheted and punctured a tank, releasing a large quantity of combustible material, and ultimately causing an explosion.

In short, the present invention is especially useful to any situation in which the operator's manual dexterity is hampered, and/or the consequences of losing control of an untethered tool component are, for any reason, unacceptable.

2. Description of the Prior Art

Various schemes have been devised for releasably locking tool components together. These include, for example, screw thread means and spring loaded detent mechanisms of various types. The latter detent mechanisms may be releasable by simply exerting a sufficient separating force, or they may be provided with release mechanisms operated, for example, by push buttons.

These prior mechanisms are unsuitable for the types of environments described hereinabove for a number of reasons. Some such mechanisms, for example screw threaded type mechanisms, are difficult to operate when the user is encumbered by heavy gloves or other protective garments and can only transmit torque in one direction. Conventional detent type mechanisms, on the other hand, may not provide sufficiently positive insurance against accidental separation of the tool components during use. Mechanisms operable by push buttons or the like accessible on the exterior of the tool may be inadvertently operated in use, particularly where the operator has his dexterity encumbered by the environment and/or his protective clothing. Furthermore, the problems in the prior art revolving around difficulty of assembly and disassembly, inadvertent release, etc., are undesirable and bothersome even when the user is working barehanded in an amicable environment.

In any event, none of these prior systems provide any means for controlling or recovering a tool component which may simply be dropped by the user while attempting assembly or disassembly. For the latter purpose, for example in connection with activities in space, tethers have been employed, with each component of the tool having its own respective tether, which may be attached to the user's clothing, to a work station or tool box, or to some other suitable base structure. However, where the tool in question must be operated, e.g. with a rotary or reciprocating motion, such multiple tethers may interfere with the necessary movements and/or become entangled with one another. Swivel rings, movable collars, and the like designed to facilitate the necessary movements of the tool have not been entirely successful in eliminating entanglement of the tethers and similar problems.

SUMMARY OF THE INVENTION

The present invention provides a connection system which, while simple to operate, positively insures against loss of a tool component without the need for multiple tethers during use of the tool. The system includes first and second bodies, which comprise the respective tool components to be connected. The two bodies have matable formations, preferably a receptacle in the first body and a mating male member on the second body. A coupling means is cooperative between the bodies for selectively maintaining these formations in mated condition. The coupling means includes an operator located internally of the first body. An actuator is selectably insertable into and disengagable from the first body, the actuator being movable relative to the first body when so inserted therein for engagement with and operation of the aforementioned operator. Because the operator is located internally of one of the bodies and can be operated only by insertion and manipulation of the actuator, accidental disengagement of the bodies during use, as by bumping against an external object, is precluded.

The actuator itself is preferably provided with retainer means whereby it is releasably retained in engagement with the first body when inserted therein. This expedient is advantageous in providing positive control or insurance against loss of any one of the tool components, without the need for the use of multiple tethers during operation of the tool. For example, the second body may be provided with a tether. The actuator may likewise be provided with a tether. During operation of the tool comprised of the assembled first and second bodies, the actuator may be removed whereby the tether on the second body provides control for the entire tool. In order to disconnect the first and second bodies, the actuator must be inserted into the first body, whereupon it may be engaged with that body by the aforementioned retainer means. Then, as the bodies are disconnected by manipulation of the actuator, the second body remains controlled by its own respective tether, while the actuator and the first body, being held in engagement by the retainer means, are controlled by the tether on the actuator. When the bodies are reassembled, the actuator remains engaged with the first body until after the coupling means have been latched and locked. Only then is the actuator removed, thereby separating its tether from the assembled tool, with the bodies once again being positively coupled together and jointly controlled by the tether on the second body.

The coupling means preferably comprises a latch means engageable between the first and second bodies to retain the male member of the second body in the receptacle of the first body, the latch means being reciprocable in a directional mode transverse to that in which the male member and receptacle are moved for mating engagement. The coupling means further comprises lock means carried by the first body and including a lock member operatively associated with the latch means and movable between a locking position, maintaining engagement of the latch means, and a releasing position, permitting release of the latch means. As mentioned, the reciprocation of the latch means is transverse to the directional mode of movement for mating engagement of the bodies. The directional mode of movement of the lock member between its locking and releasing positions is, in turn, transverse to the directional mode of reciprocation of the latch means. This arrangement helps to insure a positively locked connection whereby the two bodies cannot be inadvertently separated by the application of excessive force. This positive locking effect is further enhanced in preferred embodiments wherein the latch means includes a latch member carried by the first body extendable and retractable with respect thereto for engagement with the male member. The lock means, in its locking position, provides a rigid abutment, as opposed to a resilient or yieldable abutment, against the latch member maintaining the latter extended and engaged with the male member.

For further convenience in use, the system may be designed so that the necessary movement of the actuator for operation of the lock operator is a continuation of the linear motion by which the actuator is inserted into the first body. To further aid in assembly, auxiliary latch means, such as a more conventional spring biased detent system, may be provided for temporarily yieldably maintaining the male member in the receptacle while the actuator is manipulated to operate the lock means.

Accordingly, it is a principal object of the present invention to provide an improved system for connecting two bodies, particularly, though not exclusively, suited for applications in which the operator is encumbered and/or dropping or loss of one of the bodies is unacceptable.

Another object of the present invention is to provide such a system which provides for positive control of all tool components at all times, without requiring the use of multiple tethers during actual use of the assembled tool.

A further object of the present invention is to provide such a system in which inadvertent operation so as to release the coupled components is precluded.

Still another object of the present invention is to provide such a system in which inadvertent disconnection of the coupled components through the application of excessive forces is precluded.

Yet another object of the present invention is to provide such a system which is simple to operate while effecting a reliable positively locked connection.

Still other objects, features and advantages of the present invention will be made apparent by the following detailed description, the drawings, and the claims.

DETAILED DESCRIPTION

Figure 1:
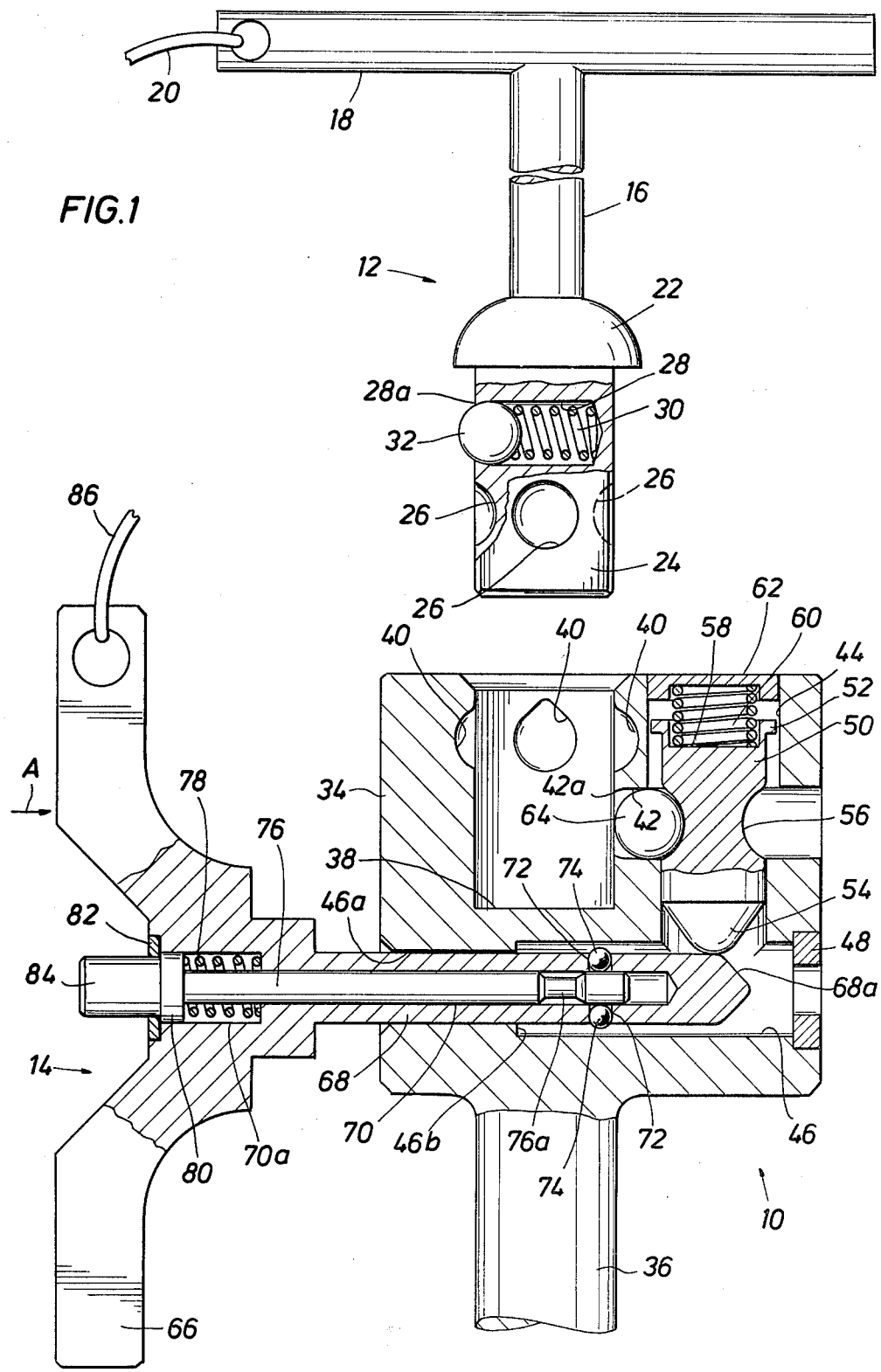
FIG. 1 is a partial cross-sectional/partial elevational exploded view of the tool components of the invention in position for assembly.

Referring to the drawing, the connection system illustrated as an exemplary embodiment includes three major components or subassemblies: a first body or female component 10, a second body or male component 12, and an actuator 14. The male component 12 is diagramatically illustrated as a wrench handle having a shaft 16 which might include a ratchet mechanism or any other desirable features. At one end of shaft 16 is a crossbar 18 to which is secured a tether 20. Tether 20 and its attachment are shown in simplified form, and it will be understood that the tether could be secured to the shaft by a swivel mechanism or other means for alleviating any tendency of the tether to interfere with proper movement and use of the tool of which component 12 forms a part. Near the opposite end of shaft 16 from crossbar 18 is a guard 22, and outboard of guard 22 is a male member or pin 24. Pin 24 is of square transverse cross-sectional configuration, with the exception of interruptions in the form of a series of recesses 26 and a bore 28. Recesses 26 are four in number, one recess being located in each side of the square pin 24. Recesses 26 are of partial spherical configuration, and are all located an equal distance from the free or outboard end of pin 24. Bore 28 opens through one side of pin 24 as indicated at 28a and extends partially transversely through pin 24. A helical compression spring 30 is mounted in bore 28, with one end abutting the bottom or closed end of the bore and the other end abutting a ball 32 also mounted in bore 28. The mouth 28a of bore 28 forms a restriction of slightly smaller diameter than the remainder of bore 28, said diameter also being slightly smaller than that of ball 32. Thereby mouth 28 prevents ball 32 from being expelled from bore 28, although spring 30 will normally cause ball 32 to protrude partially through mouth 28a as shown in FIG. 1. For purposes of illustration, the structure of component 12 is shown in simplified form, and it will be appreciated that, for example, the bottom or closed end of bore 28 may be defined by a removable plug to provide for installation of spring 30 and ball 32.

The female component 10 includes a housing block portion 34 defining a receptacle 38 and a tool portion 36 extending longitudinally from block 34. As used herein, terms such as "longitudinally," "laterally," etc. will refer to pin 24 and the mating receptacle 38, unless otherwise noted. Tool portion 36 may include a wrench socket or the like for manipulation or operation by handle shaft 16 when components 10 and 12 are coupled as described hereinafter.

As indicated hereinabove, housing block 34 has a receptacle 38 sized and configured to mate with pin 24. More specifically, receptacle 38 is square in transverse cross section except for the interruptions formed by recesses 40 and bore 42. The square cross sections of pin 24 and receptacle 38 allow for the transmission of torque therebetween. Recesses 40 are four in number, one such recess being formed in each of the four side walls of receptacle 38. Recesses 40 are partial spherical in configuration, and are positioned to align with ball 32 when pin 24 is mated in receptacle 38. Bore 42 has a restricted mouth 42a opening through one of the side walls of receptacle 38. A cylindrical slideway 44 is formed in block 34 parallel to receptacle 38, with bore 42 interconnecting slideway 44 and receptacle 38. Slideway 44 extends longitudinally beyond the bottom or closed end of receptacle 38 to intersect a transverse bore 46 extending completely through block 34. Bore 46 has a reduced diameter section 46a at one end, which forms a shoulder 46b with the remainder of the bore. At the opposite end of bore 46, there is press fitted or otherwise rigidly mounted a short annular restrictor 48 having an inner diameter even smaller than that of section 46a of bore 46.

A lock member in the form of a plunger 50 is slidably mounted in slideway 44. It will be observed that the diameter of slideway 44 above bore 42 is slightly greater than the diameter of the slideway at and below bore 42. Plunger 50 has an uppermost annular flange 52 generally sized for a loose sliding fit in the upper portion of slideway 44. The variation in diameter of slideway 44 forms a stop shoulder engagable with flange 52 to limit downward movement of the plunger. The main body of plunger 50 is cylindrical and sized for a sliding fit in the lower portion of slideway 44. The lowermost end 54 of plunger 50 has a generally conical configuration, with a radiused apex, and serves as an operator for the lock means in a manner to be described hereinbelow. The central cylindrical portion of plunger 50 has, intermediate its ends, an annular recess 56 of arcuate cross-sectional configuration. The upper end of plunger 50 has an axial recess 58 in which is disposed the lower end of a helical compression spring 60. A plug 62 is rigidly fitted into the upper end of slideway 44 and abuts the upper end of spring 60.

Figure 2:
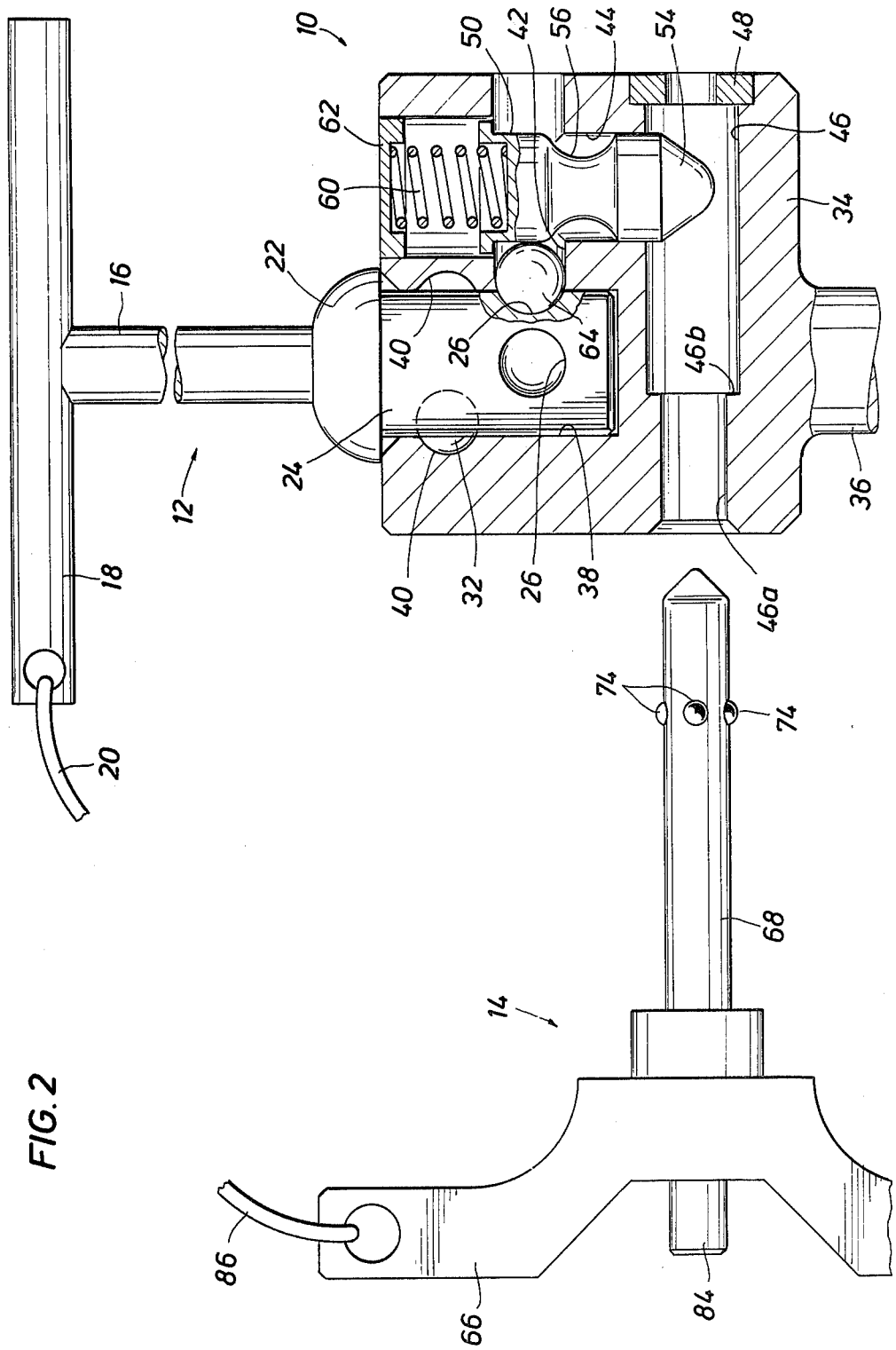
FIG. 2 is a view similar to that of FIG. 1 showing the tool components coupled and the actuator removed.

Bore 42 is sized to slidably receive a ball 64. When plunger 50 is in an uppermost or releasing position, as shown in FIG. 1, ball 50 may be received in recess 56. When plunger 50 moves to its lowermost or locking position, as shown in FIG. 2, the cylindrical portion of plunger 50 forces ball 64 out of recess 56 so that it protrudes through restricted mouth 42a into receptacle 38. Mouth 42a is of sufficiently small diameter to prevent ball 64 from being completely expelled from bore 42. Spring 60 will ordinarily urge plunger 50 into its locking position, wherein ball 64 is forced to protrude through mouth 42a.

The third subassembly 14 is not an actual component of the socket wrench tool to be made up from the other two components 10 and 12, but is an actuator by means of which said other two components can be connected and disconnected with each other. However, where the system is being used in an environment wherein loss of one component would be, for some reason, unacceptable, subassembly 14 is normally engaged with female component 10, in a manner to be described hereinbelow, at all times at which component 10 is not connected to component 12, whereby actuator 14 further serves as a tethering link or control device for component 10.

Actuator 14 includes a handle 66 and an elongate stinger 68 integrally adjoined to and extending from handle 66. Stinger 68 has a conical nose 68a similar to that of plunger 50. Assembly 14 is further provided with a retainer means whereby it may be selectively engaged with component 10. This retainer means is of a well-known ball detent type, and thus, will only be described briefly herein. A bore 70 extends through the center of handle 66 and lengthwise into stinger 68. A series of smaller bores 72 radiate from central bore 70 and open outwardly through stinger 68. Each of the bores 72 receives a respective ball 74, the mouths of bores 72 on the outer surface of stinger 68 being of such diameter to permit balls 72 to protrude from the bores but not to be expelled therefrom. A shaft 76 is slidably received in bore 70. Bore 70 is counterbored at 70a within handle 66 to receive a compression spring 78 which surrounds shaft 76. One end of spring 78 abuts the shoulder formed between counterbore 70a and the remainder of bore 70, while the other end of spring 78 abuts an annular flange 80 on shaft 76. Flange 80 in turn abuts a retainer ring 82 rigidly affixed to handle 66 at the outer end of counterbore 70a. A push-button 84, integral with shaft 76, protrudes through ring 82. Spring 78 normally urges shaft 76 outwardly, so that the major diameter portion thereof underlies balls 74, forcing them to protrude through bores 72. However, by depressing button 84, shaft 76 may be urged inwardly, so that a reduced diameter neck portion 76a of the shaft is brought into alignment with balls 74, permitting them to retract inwardly within their bores 72. A tether 86 is suitably connected to handle 66.

The operation of the system is as follows:

When not in use, female component 10 is normally engaged with, and thus tethered by, actuator 14. In particular, stinger 68 is inserted into bore 46 through its reduced diameter section 46a. Because the outer diameter of stinger 68 is sized for a fairly close sliding fit in bore section 46a, button 84 must be depressed, to permit retraction of balls 74, in order to a low such insertion. Once the stinger has been inserted, push button 84 is released, and balls 74 are forced outwardly through their bores 72 by shaft 76. With reference to FIG. 1, it can be seen that balls 74 will thus extend outwardly to a diameter greater than that of bore section 46a whereby they may serve as retainer means engagable with shoulder 46b to prevent stinger 68 from falling out of bore 46. Spring 78 normally biases balls 74 to their outer or engaging configuration so that, when stinger 68 is in bore 46, connection of body 10 and actuator 14 is automatic in the absence of active releasing action by the user.

When it is desired to connect female component 10 with male component 12, stinger 68 is moved deeper into bore 46 by pushing on handle 66. The nose 68a of stinger 68 will engage operator 54 of plunger 50, the tapered surfaces of nose 68a and operator 54 serving as cams, to urge plunger 50 away from bore 46 (upwardly as viewed in the drawings) against the bias of spring 60. The parts will then be in the positions shown in FIG. 1. Recess 56 will thus be brought into alignment with bore 42, whereby ball 64 may move into recess 56 so that it no longer protrudes through mouth 42a into receptacle 38.

Pin 24 is then inserted into receptacle 38. If ball 64 has not already moved into the position shown in FIG. 1, insertion of pin 24 into receptacle 38 will force ball 64 out of the receptacle and into recess 56. At the same time, insertion of pin 24 into receptacle 38 will cause ball 32 to be temporarily retracted, compressing spring 30, until pin 24 is fully engaged in receptacle 38. At that point, ball 32 will be aligned with one of the recesses 40, and will be re-extended by spring 30 to serve as a temporary or auxiliary latch for retaining pin 24 in receptacle 38 until the primary latch mechanism can be locked in engagement. It should be noted that, because receptacle 38 is provided with a recess 40 in each of its four side walls, it is not necessary for the operator to insert pin 24 into receptacle 38 in any particular orientation.

After pin 24 has thus been inserted into receptacle 38, and temporarily latched by ball 32, the operator pulls outwardly on handle 66 of actuator 14 until its movement is arrested by abutment of balls 74 with shoulder 46b. This permits plunger 50 to move toward bore 46 (downwardly as shown in the drawings) to the position of FIG. 2. Thus, the cylindrical portion of plunger 50 is brought into alignment and abutment with ball 64, urging it through mouth 42a of bore 42 and into the recess 26 of whichever side of pin 24 is located adjacent bore 42. This effects the primary latch for retaining pin 24 in receptacle 38. The engagement of flange 52 in the upper part of slideway 44 and the engagement of the main cylindrical portion of plunger 50 in the lower part of slideway 44 prevents substantial lateral movement or tilting of the plunger. It should be noted that, because the cylindrical portion of plunger 50 provides a rigid abutment for ball 64 (as contrasted with the yielding abutment of spring 30 with ball 32), with the directional mode of movement of plunger 50 and its resilient biasing spring 60 being transverse to the direction of reciprocation of latch ball 64, a positive locking of latch 64 is effected. Thus, male component 12 cannot be disconnected from female component 10 by merely pulling on the components.

At this point, the operator can test the connection which has been made up in several ways. This can be done by pulling on the shaft 16 of male component 12 and also by looking through the opening in restriction ring 48 to be sure that the nose 54 of plunger 50 has entered bore 46 thereby locking the latched ball 64 in engagement with pin 24. At this point, female component 10 will be positively latched and locked to male component 12. Since male component 12 is in turn tethered to a suitable base structure by tether 20, actuator 14 can be removed from bore 46 by depressing button 84, to permit retraction of balls 74, and withdrawing stinger 68 from bore 46 through its small diameter section 46a. Actuator 14 remains controlled by its own respective tether 86, while the assembled tool 10, 12 is controlled by a single tether 20, thereby permitting easier manipulation of the tool without the danger of entangling two tethers.

When it is desired to disconnect components 10 and 12, actuator 14 is reinserted into bore 46. It may be noted that, because the inner diameter of ring 48 is smaller than that of bore section 46a, insertion of stinger 68 into the wrong end of bore 46 is precluded. By a continuation of the linear motion of insertion of stinger 68, the operator can once again cam plunger 50 upwardly so that balls 64 may move into recess 56. Pin 24 may then be removed from receptacle 38 by pulling on shaft 16 with a force sufficient to overcome the bias of spring 30 of the auxiliary latch mechanism. Components 10 and 12 are thus disengaged, while component 10 has been once again engaged with and tethered by actuator 14.

An important aspect of the present invention is that, once components 10 and 12 have been connected as described hereinabove, the locking mechanism cannot be inadvertently released, due to the location of operator 54 internally of block 34 of component 10, with only limited access through the ends of bore 46. Furthermore, because the actuator stinger 68 must be inserted into bore 46 in order to move lock member 50 to its releasing position, component 10 is always automatically reengaged with and tethered by actuator 14 before it can be disconnected from tethered male component 12. Conversely, in engaging components 10 and 12, stinger 68 cannot be removed from bore 46 without automatically disengaging from plunger 50, allowing the latter to move into its locking position, and thus ensuring positive control of component 10 via component 12 and its tether 20.

While the system of the present invention thus provides for virtually automatic positive control of all components at all times, it eliminates the necessity for multiple tethers on the assembled tool 10, 12 while it is in actual use. Furthermore, the connection and disconnection procedures can be accomplished by a few relatively simple linear movements, and thus performed by persons wearing cumbersome protective clothing. Even in situations wherein positive control is not as critical, or wherein the operator need not be encumbered with heavy gloves or the like, the system of the present invention is advantageous due to its simplicity of operation, and preclusion of inadvertent disconnection of the tool components, either by the exertion of forces on those components, or by inadvertent operation of the locking mechanism.

The foregoing represents only one exemplary embodiment of the invention, and it will be appreciated that numerous modifications can be made within the spirit and scope of the invention. For example, the means of engagement of the actuator with the operator of the lock mechanism and/or the mode of manipulation or movement of the actuator relative to component 10 in order to operate said lock mechanism may be varied. For example, systems could be devised wherein the actuator would be inserted into the appropriate tool component with a linear motion, and the lock mechanism operated by a subsequent rotary motion of the actuator. Another variation might include the provision of two latch and lock mechanisms, located on opposite sides of the receptacle of the female component, to provide better balance in operation. Such a modification might be further coupled with the aforementioned variation in which the mode of operation of the lock means by the actuator is altered. The system could be used to connect and disconnect virtually any type of subassemblies or components, and is not limited to use with wrench-type tools.

Other modifications might involve the mode of use of various features of the apparatus. For example, a tool box, mounting board or other base structure could be provided with a number of fixed structures similar to pin 24 with suitable recesses and auxiliary latches for mounting and storing respective female components such as 10. An actuator such as 14 could be used to remove those female components and transfer them to a wrench handle such as 12 while maintaining constant control over the female components.

Still other modifications will suggest themselves to those of skill in the art. Accordingly, it is intended that the scope of the present invention be limited only by the claims which follow.

I claim:

1. A mechanical connection system comprising:
   first and second bodies having matable formations;
   coupling means cooperative between said bodies for selectively maintaining said formations in mated condition, said coupling means comprising operator means located internally of said first body;
   actuator means selectively insertable into and disengagable from said first body, said actuator means being movable relative to said first body when so inserted therein for engagement with and operation of said operator means; and
   means for selectively engaging said actuator means within said first body and for totally removing said actuator means from within sid first body.

2. The system of claim 1 wherein:
   said matable formation of said first body includes a receptacle;
   said matable formation of said second body includes a male member matingly receivable in said receptacle by relative movement of said bodies in a first directional mode;
   and said coupling means comprises—
   latch means engagable between said first and second bodies to retain said male member in said receptacle, said latch means being reciprocable in a second directional mode transverse to said first directional mode,
   and lock means carried by said first body and including a lock member operatively associated with said latch means and movable, transverse to said second directional mode, between a locking position maintaining engagement of said latch means and a releasing position permitting release of said latch means, said operator means including a portion of said lock member engagable to move said lock member from said locking position to said releasing position.

3. The system of claim 2 wherein said latch means includes a latch member carried by said first body and extendable and retractible with respect thereto for engagement with said male member, and wherein said lock means, in said locking position, provides a rigid abutment against said latch member maintaining said latch member extended and engaged with said male member.

4. The system of claim 3 wherein said lock means further comprises means resiliently biasing said lock member to said locking position.

5. The system of claim 4 wherein said actuator is engagable with said operator for operation thereof by linear movement comprising a continuation of the movement for insertion of said actuator into said first body.

6. The system of claim 5 wherein said linear movement of said actuator is transverse to the direction of movement of said lock member.

7. The system of claim 6 wherein said actuator and said lock member have engagable cam surface means.

8. The system of claim 6 wherein the direction of movement of said lock member is parallel to said first directional mode.

9. The system of claim 1 further comprising retainer means cooperative between said actuator and said first body for selectively retaining said actuator in engagement with said first body.

10. The system of claim 9 further comprising means biasing said retainer means to a normally engaged configuration.

11. The system of claim 9 further comprising first tether means connected to said actuator and second tether means connected to said second body.

12. The system of claim 1 further comprising auxiliary latch means engagable between said first and second bodies for yieldably retaining said formations in mated condition.

13. A mechanical connection system comprising:
    a first body defining a receptacle;
    a second body defining a male member matingly receivable in said receptacle by relative movement in a first directional mode;
    coupling means comprising—
    primary latch means engagable between said first and second bodies to retain said male member in said receptacle, said primary latch means being reciprocable in a second directional mode transverse to said first directional mode,
    lock means carried by one of said bodies and including a lock member operatively associated with said primary latch means and movable, transverse to said second directional mode, between a locking position maintaining engagement of said primary latch means and a releasing position permitting release of said primary latch means, said lock member including an operator portion engagable to move said lock member from said locking position to said releasing position;
    means limiting access to said operator portion of said lock member from the exterior of said one body;
    actuator means selectively insertable into and disengagable from said one body, said actuator means being movable relative to said one body when inserted therein for engagement with and operation of said operator portion; and
    means for selectively engaging said actuator means within said one body and for totally removing said actuator means from within said one body.

14. The system of claim 13 wherein said one body is said first body.

15. The system of claim 14 wherein the direction of movement of said lock member is generally parallel to said first directional mode.

16. The system of claim 15 wherein said lock means further comprises means resiliently biasing said lock member to said locking position.

17. The system of claim 16 wherein said first body has a slideway therein receiving said lock member, and an actuator bore transverse to and intersecting said slideway; said operator portion of said lock member comprising an end thereof extending into said actuator bore when said lock member is in said locking position.

18. The system of claim 17 wherein said actuator means is selectively insertable into said actuator bore for engagement with said operator portion of said lock member to move said lock member from said locking position to said releasing position.

19. The system of claim 17 wherein said first body has an inspection port therein, communicating with said actuator bore in alignment with said operator portion of said lock member when in said locking position.

20. The system of claim 19 wherein said actuator bore has an insertion port distal said inspection port.

21. The system of claim 16 wherein said primary latch means includes a latch member carried by said first body and extendable and retractible for engagement with said male member, and wherein said lock means, in said locking position, provides a rigid abutment against said latch member maintaining said latch member extended and engaged with said male member.

22. The system of claim 21 further comprising auxiliary latch means engagable between said first and second bodies to yieldably retain said male member in said receptacle.

* * * * *